US007122247B2

(12) United States Patent
Jibing et al.

(10) Patent No.: US 7,122,247 B2
(45) Date of Patent: *Oct. 17, 2006

(54) RADIATION-CURABLE COMPOSITION WITH SIMULTANEOUS COLOR FORMATION DURING CURE

(75) Inventors: Lin Jibing, St. Charles, IL (US); Montgomery I. Eva, Woodstock, IL (US); Snowwhite E. Paul, Jr., Muskego, WI (US); Petisce R. James, Jacksonville, FL (US); Kotesky Anton, South Elgin, IL (US)

(73) Assignee: DSM IP Assets B.V., Te Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/631,563

(22) Filed: Jul. 31, 2003

(65) Prior Publication Data

US 2004/0024080 A1 Feb. 5, 2004

Related U.S. Application Data

(63) Continuation of application No. 09/625,853, filed on Jul. 26, 2000, now Pat. No. 6,630,242.

(60) Provisional application No. 60/157,559, filed on Oct. 4, 1999, provisional application No. 60/146,525, filed on Jul. 30, 1999.

(51) Int. Cl.
*C03C 25/10* (2006.01)
*C08F 2/46* (2006.01)
*G02B 6/02* (2006.01)
*C09D 175/14* (2006.01)

(52) U.S. Cl. .......................... 428/378; 522/25; 522/26; 522/31; 522/32; 522/75; 522/96; 522/90; 522/103; 385/114; 385/128

(58) Field of Classification Search ................ 522/74, 522/75, 78, 82, 90, 96, 182, 33, 46, 42, 173, 522/170, 174, 25, 26, 31, 103; 428/378, 428/380, 383; 427/508, 558, 559, 385.5; 385/114, 128
See application file for complete search history.

(56) References Cited

U.S. PATENT DOCUMENTS

| 4,399,209 A | 8/1983 | Sander et al. |
| 4,472,019 A | 9/1984 | Bishop et al. |
| 4,624,994 A | 11/1986 | Ansel |
| 4,629,285 A | 12/1986 | Carter et al. |
| 4,682,851 A | 7/1987 | Ansel |
| 4,782,129 A | 11/1988 | Moschovis et al. |
| 4,788,125 A | 11/1988 | Davis et al. |
| 4,794,133 A | 12/1988 | Moschovis et al. |
| 4,806,574 A | 2/1989 | Krajewski et al. |
| 4,849,462 A | 7/1989 | Bishop |
| 4,906,067 A | 3/1990 | Mayr et al. |
| 4,932,750 A | 6/1990 | Ansel et al. |
| 5,074,643 A | 12/1991 | Petisce |
| 5,219,896 A | 6/1993 | Coady et al. |
| 5,259,060 A | 11/1993 | Edward et al. |
| 5,336,563 A | 8/1994 | Coady et al. |
| 5,377,292 A | 12/1994 | Bartling et al. |
| 5,621,838 A | 4/1997 | Nomura et al. |
| 5,812,725 A | 9/1998 | Petisce |
| 5,942,554 A | 8/1999 | Ren et al. |
| 2002/0057881 A1 | 5/2002 | Greer, IV |

FOREIGN PATENT DOCUMENTS

| EP | 0 194 891 | 9/1986 |
| EP | 0 432 931 | 6/1991 |
| EP | 0 614 099 | 9/1994 |
| EP | 0 345 968 | 3/1997 |
| EP | 0 535 984 | 8/1998 |
| JP | 63 070210 | 3/1988 |
| JP | 1022976 | 1/1989 |
| JP | 1152405 | 6/1989 |
| WO | WO 88/00223 | 1/1988 |
| WO | WO 94/25665 | 11/1994 |
| WO | WO 98/03443 | 1/1998 |
| WO | WO 98/16590 | 4/1998 |
| WO | WO 98/37030 | 8/1998 |
| WO | WO 99/38043 | 7/1999 |

OTHER PUBLICATIONS

"Synthesis and Properties of Phthalide-Type Color Formers" by Ian J. Fletcher et al., *Chemistry and Applications of Leuco Dyes*, pp. 97-123.
"The Chemistry of Fluoran Leuco Dyes," by Yoshihiro Hatano, *Chemistry and Applications of Leuco Dyes*, pp. 159-205.
"Photoinitiators and Cationic Polymerization Monomers," by Marc J.M. Abadie et al., *European Coatings Journal*, Apr. 1994, pp. 202-207.
"Photoinitiation of Ionic Polymerizations," by Wolfram Schnabel, *Macromolecular Engineering*, 1995, pp. 67-83.
"UV-Curable, Special Coding Inks for Optical Fibers," by Gexing Shen et al., *Journal of Coatings Technology*, vol. 71, No. 894, Jul. 1999, pp. 69-72.
"Photoinduced Polymerization With Simultaneous Color Formation of Fluorane Dye With Diaryliodonium Salts," by Zhou Wenhui et al., translation of Chinese Journal article, Institute of Photographic Chemistry, Sep. 1997.

*Primary Examiner*—Sanza L. McClendon
(74) *Attorney, Agent, or Firm*—Leydig, Voit & Mayer, Ltd.

(57) ABSTRACT

A radiation-curable fiber optic coating composition for an inner primary coating includes a coloring agent, preferably a dye or a dye precursor, compatible with the fiber of the fiber optic and capable of imparting a pre-selected color to the inner primary coating, or another coating. The coloring agent can be a reactive dye. Any of the dyes preferably is stabilized by a stabiliser in the colored coating layer, or, preferably, in a more exterior layer.

48 Claims, No Drawings

RADIATION-CURABLE COMPOSITION WITH SIMULTANEOUS COLOR FORMATION DURING CURE

CROSS-REFERENCE TO RELATED PATENT APPLICATIONS

This patent application is a continuation of U.S. patent application Ser. No. 09/625,653, filed Jul. 26, 2000, now U.S. Pat. No. 6,630,242 which is hereby incorporated by reference in its entirety. This patent application claims the benefit of U.S. Provisional Patent Application No. 60/157,559, filed Oct. 4, 1999, and U.S. Provisional Patent Application No. 60/146,525, filed Jul. 30, 1999.

FIELD OF THE INVENTION

The present invention relates generally to optical fiber coating compositions, and, more particularly, to fiber optic coating compositions that include a coloring agent.

BACKGROUND OF THE INVENTION

Optical glass fibers are frequently coated with two or more superposed radiation-curable coatings which together form a primary coating immediately after the glass fiber is produced by drawing in a furnace. The coating which directly contacts the optical glass fiber is called the "inner primary coating" and an overlaying coating is called the "outer primary coating." In older references, the inner primary coating was often called simply the "primary coating" and the outer primary coating was called a "secondary coating," but for reasons of clarity, that terminology has been abandoned by the industry in recent years. Inner primary coatings are softer than outer primary coatings.

Single-layered coatings ("single coatings") can also be used to coat optical fibers. Single coatings generally have properties (e.g., hardness) which are intermediate to the properties of the softer inner primary and harder outer primary coatings. The relatively soft inner primary coating provides resistance to microbending which results in attenuation of the signal transmission capability of the coated optical fiber and is therefore undesirable. The harder outer primary coating provides resistance to handling forces such as those encountered when the coated fiber is ribboried and/or cabled.

Optical fiber coating compositions, whether they be inner primary coatings, outer primary coatings, or single coatings, generally comprise, before cure, a polyethylenically-unsaturated monomer or oligomer dissolved or dispersed in a liquid ethylenically-unsaturated medium and a photoinitiator. The coating composition is typically applied to the optical fiber in liquid form and then exposed to actinic radiation to effect cure.

For the purpose of multi-channel transmission, optical fiber assemblies containing a plurality of coated optical fibers have been used. Examples of optical fiber assemblies include ribbon assemblies and cables. A typical ribbon assembly is made by bonding together a plurality of parallel oriented, individually coated optical fibers with a matrix material. The matrix material has the function of holding the individual optical fibers in alignment and protecting the fibers during handling and installation. Often, the fibers are arranged in "tape-like" ribbon structures, having a generally flat, strand-like structure containing generally from about 2 to 24 fibers. Depending upon the application, a plurality of ribbon assemblies can be combined into a cable which has from several up to about one thousand individually coated optical fibers. An example of a ribbon assembly is described in published European patent application No. 194891. A plurality of ribbon assemblies may be combined together in a cable, as disclosed, for example, in U.S. Pat. No. 4,906,067.

The term "ribbon assembly" includes not only the tape-like ribbon assembly described above, but optical fiber bundles as well. Optical fiber bundles can be, for example, a substantially circular array having at least one central fiber surrounded by a plurality of other optical fibers. Alternatively, the bundle may have other cross-sectional shapes such as square, trapezoid, and the like.

Coated optical fibers whether glass, or as has come into use more recently, plastic, for use in optical fiber assemblies are usually colored to facilitate identification of the individual coated optical fibers. Typically, optical fibers are coated with an outer colored layer, called an ink coating, or alternatively a colorant is added to the outer primary coating to impart the desired color.

Heretofore, the inner primary coating has not been colored. Coloring agents have not been included in the inner primary coating due to difficulties in obtaining proper cure of the inner primary coating in the presence of the pigments that have been used: commonly in the art to impart color to ink compositions.

Solvent-based, solid-based and pigment-based ink coatings have been used to impart color to coated optical fiber. However, none of these types of ink coatings is entirely satisfactory.

Solvent-based ink coatings are not satisfactory because solvent emissions cause environmental concerns. A further disadvantage of solvent-based systems is that finishing time is limited by the rate at which the solvent can be removed. Solvent removal rate is generally far too slow for high speed manufacture of optical fibers; Solid-based coloring systems are also too slow.

Ultraviolet curable pigment-based inks are described, for example, in U.S. Pat. No. 4,629,285. Pigment-based ink coatings are formed from a pigment dispersed within a UV curable carrier system. The UV curable carrier system contains a UV-curable oligomer or monomer that is liquid before curing to facilitate application of the ink composition to the optical fiber, and then turns to a solid after being exposed to UV radiation. In this manner, the UV-curable ink composition can be applied to a coated optical fiber in the same manner as the inner primary and outer primary coatings are applied.

Pigment-based ink coatings are not entirely satisfactory because the pigment particles tend to act as an internal reflector, causing scattering of the curing radiation and also tending to absorb actinic radiation. As a result, radiation is prevented from penetrating the entire thickness of the coating, thereby extending curing time, or limiting thorough cure. While photoinitiators which absorb light at a different wavelength than the polymer have been used in pigment-based ink coatings to improve thorough cure and cure time, the scattering problem still remains.

Further, pigment-based ink compositions are not useful to impart color to either the inner primary coating or to matrix materials. Inclusion of pigments in the inner primary coating can abrade the glass or plastic waveguide of the coated optical fiber. Matrix materials are thicker than the inner primary coating or outer primary coating, and inclusion of pigments in the matrix materials can impair thorough cure of the matrix materials.

Despite the efforts of the prior art to provide materials and methods to impart color to coated optical fibers, there remains a need for a method of achieving the color necessary to facilitate identification of the individual coated optical fibers or of other desired components while satisfying the many diverse requirements desired, viz., improved curing and enhanced cure speeds and versatility in application while still achieving the desired physical characteristics of the various coatings employed. There also remains a need for an inner primary coating composition which is colored.

BRIEF SUMMARY OF THE INVENTION

The present invention provides a radiation-curable fiber optic coating composition which includes a coloring agent (preferably a dye or a dye precursor) compatible with the fiber of the fiber optic, being capable of imparting a pre-selected color to the coated fiber optic. The invention, is particularly useful to impart color to an inner primary coating. The radiation-curable fiber optic coating composition provides improved curing and enhanced cure speeds while still achieving desirable coating characteristics in particular in wet-on-wet systems. Use of the coating compositions of the present invention eliminates the need for an ink to be applied to a coated fiber and the associated separate inking step during fiber manufacture. Full cure of the inner primary coating can be accomplished upon exposure of the inner primary coating at the first lamp either in a wet-on-dry or in a wet-on-wet system.

The present invention provides, in one embodiment, a radiation-curable fiber optic coating composition capable of curing upon exposure to actinic radiation and which is substantially colorless prior to curing but becomes color coded to a pre-selected color of choice after exposure to actinic radiation. The composition of the present invention comprises, in the uncured state, a color-forming system that is activated upon exposure to actinic radiation to impart color to the composition. The color-forming system comprises a substantially colorless dye precursor capable of forming a chromophore in the presence of at least one monomer or oligomer having a radiation-curable functional group which can form free radicals in the presence of actinic radiation and a photoinitiator for the monomer or oligomer and in the presence of a cationic photoinitiator.

A stabilizer package to protect the chromophore formed from the dye precursor can be included in the coating in which the substantially colorless dye precursor is included, for example, the inner primary coating, or the stabilizer package can be included in another coating on the fiber, such as the outer primary coating, or in any combination of the coatings.

In another embodiment, the present invention provides a coating composition system that may comprise a plurality of coatings, which, in the uncured state, includes a dye as coloring agent and a stabilizer package to protect the dye in the composition in the coating layer which comprises the coloring agent, or in a coating exterior to the coating with the coloring agent. The coloring agent can be a single dye or a combination of dyes that impart the desired color to the coating. The stabilizer package provides thermal and oxidative stability to the uncured coating composition and the cured coating.

In another embodiment, the present invention provides a coating composition comprising a dye or dye precursor which is a reactive compound; preferably the dye or dye precursor is UV-curable and becomes chemically bonded in a cured polymeric coating.

DETAILED DESCRIPTION OF THE INVENTION

In accordance with one embodiment of the present invention, there is provided a dye-based coating composition which is substantially colorless before curing and which turns to the pre-selected color of choice upon curing in the presence of actinic radiation. The coating composition of the present invention has an enhanced cure rate in comparison to pigment-based coating compositions while maintaining the requisite physical properties of the cured coating, such as modulus. The coating composition facilitates processing as it can be applied to the fiber optic as a homogeneous solution, and it allows for improved through curing, and rapid cure rates.

The coating composition of the present invention can be used to impart color to the coatings typically used to coat optical waveguides, such as the inner primary coating, the outer primary coating or single coatings and to matrix materials used to form ribbon assemblies. The coating composition can also be used as an independent ink composition to be applied to pre-fabricated fiber optics, as, for example, a replacement for pigment-based ink compositions. Accordingly, an advantage of using dyes as described herein is that inks need not be used to color code fibers, as has been done heretofore. The coating composition can be used with glass waveguides or plastic waveguides.

Photoinitiators are used in the inner primary coating, the outer primary coating, or single coating composition in the practice of the present invention when the coloring agent is a substantially colorless dye precursor capable of forming a chromophore in the presence of a cation. In conventional practice, a photoinitiator is required for a UV cure. The use of a photoinitiator in the composition of the present invention is preferred in order to achieve the desired cure rate. The coating composition of the present invention is applicable to all radiation-curable, optical fiber coating compositions, whether used to coat glass or plastic waveguides.

Optical fiber coatings, as used herein, means any composition that is used to cover optical waveguides. Optical fiber coatings, as is known in the art, include inner primary coatings, outer primary coatings, single coatings, buffering coatings, and matrix materials. Optical fiber coatings are typically radiation-curable compositions that contain one or more radiation-curable oligomers or monomers having at least one functional group capable of polymerization when exposed to actinic radiation. Suitable radiation-curable oligomers or monomers are now well known and within the skill of the art. Additionally, optical fiber coatings typically include at least one reactive diluent which also includes at least one functional group capable of polymerization when exposed to actinic radiation. As is known in the art, optical fiber coatings contain different types of materials that can be varied to achieve performance characteristics depending on the function of the coating composition, as described above.

Examples of suitable radiation-curable compositions which may be used variously to form the coating compositions described above include those which are disclosed, for example, in U.S. Pat. Nos. 4,624,994, 4,682,851, 4,782,129, 4,794,133, 4,806,574, 4,849,462, 5,219,896 and 5,336,563, all of which are incorporated by reference herein.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, N-vinyl, or styrene functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing a tertiary amine or thiol.

The fiber optic radiation-curable compositions may also contain a reactive diluent which is used to adjust the viscosity. The reactive diluent can be a low viscosity monomer having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

More preferably, the radiation-curable functional group forms free radicals during curing which can react with the free radicals generated on the surface of the surface treated optical fiber.

For example, the reactive diluent can be a monomer or mixture of monomers having an acrylate or vinyl ether functionality and a $C_4$–$C_{20}$ alkyl or polyether moiety. Particular examples of such reactive diluents include:
hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
acrylamides,
and the like.

Another type of reactive diluent that can be used is a compound having an aromatic group. Particular examples of reactive diluents having an aromatic group include: ethyleneglycolphenyletheracrylate, polyethyleneglycolphenyletheracrylate, polypropyleneglycolphenyletheracrylate, and alkyl-substituted phenyl derivatives of the above monomers, such as polyethyleneglycolnonylphenyletheracrylate.

The reactive diluent can also comprise a diluent having two or more functional groups capable of polymerization. Particular examples of such monomers include:
$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as:
1,6-hexanedioldiacrylate,
trimethylolpropanetriacrylate,
hexanedioldivinylether,
triethylene-glycoldiacrylate,
pentaerythritol-triacrylate,
ethoxylated bisphenol-A diacrylate, and
tripropyleneglycol diacrylate.

If the radiation-curable functional group of the radiation-curable monomer or oligomer is an epoxy group, for example, one or more of the following compounds can be used as the reactive diluent:
epoxy-cyclohexane,
phenylepoxyethane,
1,2-epoxy-4-vinylcyclohexane,
glycidylacrylate,
1,2-epoxy-4-epoxyethyl-cyclohexane,
diglycidylether of polyethylene-glycol,
diglycidylether of bisphenol-A,
and the like.

If the radiation-curable functional group of the radiation-curable monomer or oligomer has an amine-ene or thiol-ene system, examples of reactive diluents having allylic unsaturation that can be used include:
diallylphthalate,
triallyltri-mellitate,
triallylcyanurate,
triallylisocyanurate, and
diallylisophthalate.

For amine-ene systems, amine functional diluents that can be used include, for example:
the adduct of trimethylolpropane,
isophoronediisocyanate and
di(m)ethylethanolamine,
the adduct of hexanediol, isophorondiisocyanate
and dipropylethanolamine, and
the adduct of trimethylol propane, trimethylhexamethylenediisocyanate and di(m)ethylethanolamine.

Other additives which can be used in the coating composition include, but are not limited to, catalysts, lubricants, wetting agents, antioxidants and stabilizers. The selection and use of such additives is within the skill of the art.

Single coatings can also be used. Exemplary single coatings are disclosed in, for example, U.S. Pat. No. 4,932,750, which is hereby incorporated by reference. Single coatings, like inner primary coatings, generally comprise oligomer, reactive diluent, and optional photoinitiator. and additives. Conventional outer primary coatings can be used in the practice of this invention as disclosed in, for example, U.S. Pat. No. 4,472,019, which is hereby incorporated by reference. The coating compositions generally comprise at least one oligomer, at least one diluent and at least one radical generating photoinitiator. Relative to the total coating compositions, usually the amount of oligomer is 20–80 wt. %, preferably 30–70 wt. %; the amount of diluents generally is 15–75 wt. %, preferably 20–70 wt. %; the amount of radicals generating photoinitiator is generally 0.5–20 wt. %, preferably 1–10 wt. %.

The inner primary composition can contain an adhesion promoter which has glass-binding groups that are capable of bonding to optical glass fiber under the curing conditions for the particular application of the inner primary composition to the optical glass fiber, such as, for example, the adhesion promoters described in U.S. Pat. No. 5,812,725. Such inner primary coating compositions containing adhesion promoters can be used in this invention, but the use of an adhesion promoter may be unnecessary.

Ribbon assemblies are now well known in the art and one skilled in the art will easily be able to use the disclosure provided herein to prepare a novel ribbon assembly containing at least one of the improved coated optical fibers of the present invention for the desired application. The novel ribbon assembly made according to this invention can be used in telecommunication systems. Such telecommunication systems typically include ribbon assemblies containing optical fibers, transmitters, receivers, and switches. The ribbon assembly containing the coated optical fiber of the present invention are the fundamental connecting units of telecommunication systems. The ribbon assembly can be buried underground or can be laid under water for long distance connections, such as between cities. The ribbon assembly can also be used to connect directly to residential homes.

The novel ribbon assembly made according to this invention can also be used in cable television systems. Such cable television systems typically include ribbon assemblies containing optical fibers, transmitters, receivers and switches. The ribbon assembly containing the coated optical fibers of the present invention are the fundamental connecting units of such cable television systems. The ribbon assembly can be buried under ground or laid under water for long distance connections, such as between cities. The ribbon assembly can also be used to connect directly to residential homes.

In keeping with one embodiment of the invention, the optical fiber coating composition includes a substantially colorless color-forming system before the composition is cured and which in the presence of actinic radiation imparts a pre-selected color of choice to the coated fiber.

Use of a color-forming system that is substantially colorless before cure enhances through cure of the coating, reduces radiation scattering in the coating during cure and promotes rapid cure without sacrifice of the physical properties, such as the modulus, of the cured coating. In addition, use of the coatings of the present invention permits color to transcend through the entire depth of the coating and can result in a substantially uniform color throughout the coating. This can be particularly advantageous for cabled or ribboned fiber optic assemblies in which the coating may need to be stripped for installation and use. Color throughout the depth of the coating facilitates correct identification of installed fiber optic.

The color-forming system suitable for use in the present invention comprises a substantially colorless dye precursor and a cationic photoinitiator. In accordance with the invention, the dye precursor can be any colorless dye which is capable of forming a chromophore in the presence of at least one monomer or oligomer having a radiation-curable functional group which can form free radicals in the presence of actinic radiation and a photoinitiator for the monomer or oligomer and in the presence of a cation. It will be appreciated by those skilled in the art that the selection of the dye precursor will be dependent on the desired color for the cured coating. For example, if the cured coating is to be green, then the dye precursor is selected so that the chromophore formed during cure is green. Similarly, more than one dye precursor may be included in the coating composition. Use of a mixture allows for a broad spectrum of colors to be achieved in the cured coating.

Dye precursors that have been found useful in the practice of the present invention are dye precursors which have the fluorane structure, preferably, the structure of formula I, as follows:

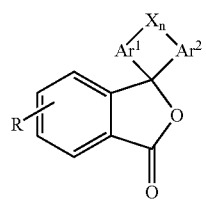

(I)

wherein X is oxygen or —NR$^1$ n is 0 or 1,

R is hydrogen, alkyl, aryl, alkoxy, aryloxy, amino, alkylamino, arylamino or amido, and R$^1$ is hydrogen, alkyl or aryl.

Ar$^1$ and Ar$^2$ may be the same or different and are unsubstituted or substituted aryl or unsubstituted or substituted heterocyclic aryl. It will be appreciated by those skilled in the art that when n=0, the aryl groups Ar$^1$ and Ar$^2$ can be fused together, or they can be unfused.

Preferably at least one of Ar$^1$ and Ar$^2$ is substituted with an amino group of the formula —NR$^2$R$^3$, wherein R$^2$ and R$^3$ may be the same or different and are hydrogen, alkyl or aryl. The substitution of the —NR$^2$R$^3$ group on either (or both) Ar$^1$ or Ar$^2$ preferably is at the 3 or 4 position, and most preferably at the 4 position of each of the aryl groups. Copikem dyes commercially available from B.F. Goodrich Specialty Chemicals are useful dye precursors.

Thus, suitable dye precursors include leuco dyes, such as isobenzofuranones. Among the isobenzofuranones that are useful in the present invention are 2'-phenylamino-3'-methyl-6'-(dibutylamino)-spiro-[isobenzofuran-1-(3H), 9'-(9H)-xanthen]-3-one; 2'-di(phenylmethyl)amino-6'-(diethylamino)spiro (isobenzofuran-1-(3H), 9'-(9H)-xanthen)-3-one; 6'-(diethylamino)-3'-methyl-2'-(phenylamino)spiro) isobenzofuran-1(3H), 9'-(9H)xanthen)-3-one; 6-(dimethylamino)-3,3-bis(4-dimethylamino)phenyl-1(3H)-isobensofuranone; and 3,3-bis(1-butyl-2-methyl-1H-indol-3-yl)-1-(3H)-isobenzofuranone.

Suitable dye precursors also include phthalide-type color formers. Phthalide-type color formers include, for example, diarylmethane phthalides such as those of the formula:

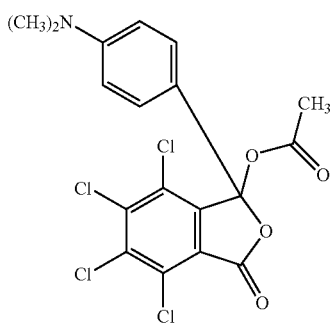

monoarylmethane phthalides such as those of the formula:

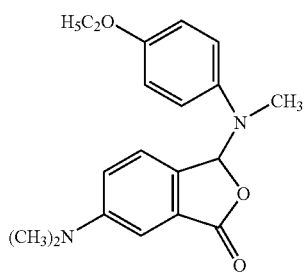

alkenyl substituted phthalides, including, by way of illustration, 3-ethylenyl phthalides of the formula:

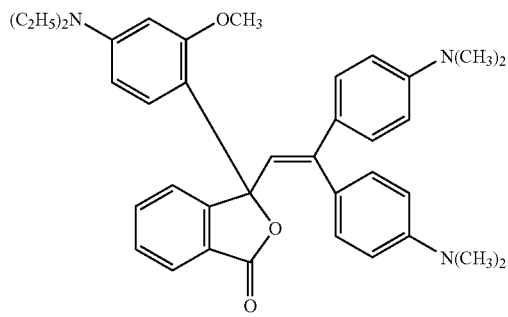

3,3-bisethylenyl phthalides of the formula:

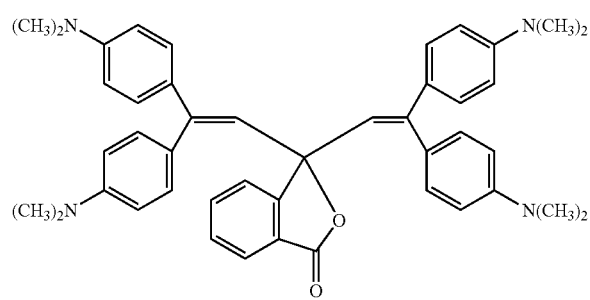

and 3-butadienyl phthalides of the formula:

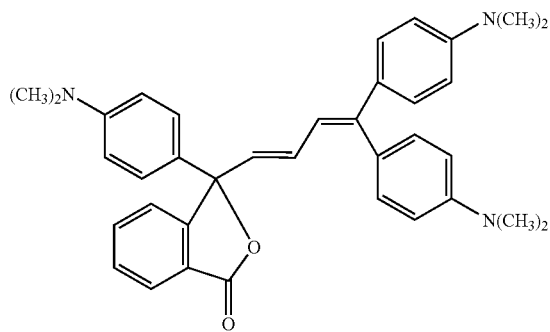

Bridged phthalides, including spirofluorene phthalides such as those of the formula:

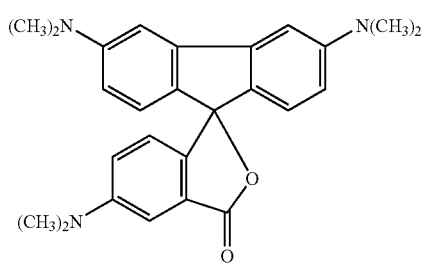

and spirobenzanthracene phthalides such as those of the formula:

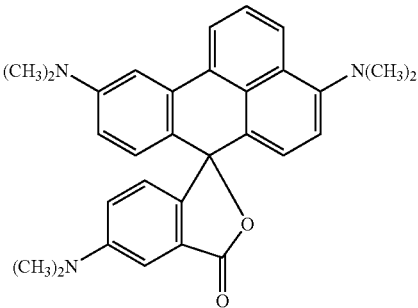

can also be used. Bisphthalides such as those of the formulas:

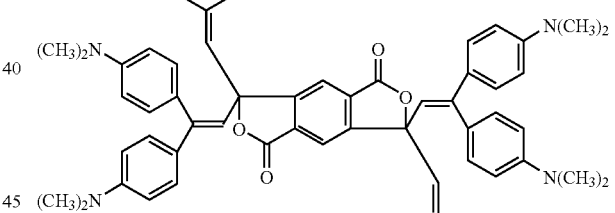

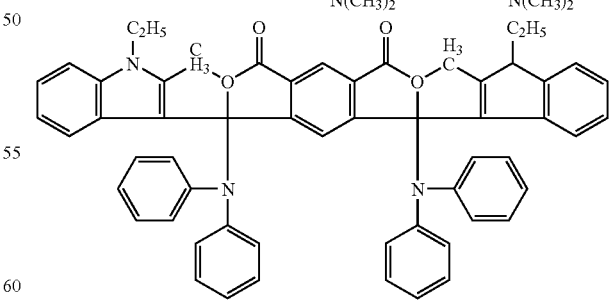

can also be used.

The amount of dye precursor included in the coating composition of the present invention is not narrowly critical. The amount to be included must be sufficient to impart the desired color to the cured coating. Generally, the dye precursor is included in the uncured composition in an amount of from about 0.1 to about 10 wt. % of the composition.

In keeping with the invention, the cationic photoinitiator for the dye precursor can be any photoinitiator which is capable of releasing a cation in the presence of actinic radiation. The term cation includes not only positively charged metal ions, but also hydrogen ion, organic moieties that are positively charged and the like.

Suitable photoinitiators for the dye precursor include diazonium salts, iodonium salts, sulfonium salts, selenium salts, pyrilium salts, N-alkoxy pyridinium slats, N-alkoxy isoquinolinium salts, phosphonium salts, arsonium salts, ferrocenium salts, iron cyclopentadiene and arene complexes. These photoinitiators are well known in the art.

The photoinitiator can be optimized for the dye precursor. For example, for the isobenzofuranone dye precursors, the preferred dye photoinitiators are diazonium salts, iodonium salts, sulfonium salts and selenium salts. Especially preferred dye photoinitiators are aryldiazonium salts, diaryliodonium salts, triarylsulfonium salts, dialkylphenylarylsulfonium salts, dialkyl-4-hydroxyphenylsulfonium salts and triarylselenium salts.

The amount of cationic photoinitiator included in the uncured coating composition is not critical, but a sufficient amount of photoinitiator must be included to effect satisfactory conversion of the dye precursor to its chromophore. Generally, the cationic photoinitiator is included in the uncured composition in an amount of from about 0.1 to about 10 wt. % of the composition, and preferably from about 1 wt. % to about 5 wt. % of the composition. The dye precursor and the cationic photoinitiator are included in the uncured composition in a weight ratio of from about 10:1 to about 1:10, and preferably in a ratio of about 1:1.

It will be appreciated that the amount of cationic photoinitiator included in the uncured composition is in addition to the photoinitiators otherwise included in the composition to effect cure of the monomers and oligomers and the like included in the coating composition to make the desired inner primary coating, outer primary coating, single coating, matrix material or ink composition. The cationic photoinitiators may thus enhance cure of the coating in addition to providing the cation necessary for the dye precursor to generate the chromophore.

The present invention also provides a coating composition, which, in the uncured state, includes a coloring agent and a stabilizer package to protect the dye in the composition. The composition can be used for the inner primary coating or the outer primary coating, or both. Thus, various color combinations can be made. For example, in an optical fiber coated with an inner primary coating and an outer primary coating, each of the inner primary coating and the outer primary coating can contain its own coloring agent, of the same or of different colors, suitably stabilized with a stabilizer package.

Moreover, as will be appreciated by those skilled in the art, various combinations of the colorless color-forming system described herein and the coloring agent comprising a dye and stabilizer package can be used to impart color to fiber optic coatings. By way of illustration and not in limitation of the present invention, dye can be included in the inner primary coating composition and a substantially colorless leuco dye can be included in the outer primary composition, and the stabilizer can be included in either the inner primary coating composition or the outer primary coating composition. Other combinations are also useful. Preferably, the inner primary coating includes the coloring agent and the outer primary coating includes the stabilizer package, although it is equally within the scope of the invention for one coating to contain both the coloring agent and stabilizer package. Thus, for example, for colored single coatings, the single coating can include both the dye and the stabilizer package. Similarly, for a colored matrix, the matrix can include both the dye and the stabilizer package.

In this embodiment of the present invention, the coating composition, preferably the inner primary coating, includes a dye or mixture of dyes that impart color to the uncured composition while maintaining good thermal or oxidative stability. Dyes that are suitable for use in the inner primary coating include polymethine dyes, di and triarylmethine dyes, aza analogues of diarylmethine dyes, aza (18) annulenes (or natural dyes), nitro and nitroso dyes, azo dyes, anthraquinone dyes and sulfur dyes. These dyes are well known in the art.

Polymethine dyes contain an electron donor and an electron acceptor group at opposite ends of the methine chain. Aza nitrogens (—N=) can replace one or more methine groups in the chain. Such dyes include cyanines, hemicyanines, streptocyanines, and oxonols.

Di and triarylmethine dyes have dimethylamino substituents in a para position to the central carbon atom on the rings. Other electron donor groups include primary, secondary, and tertiary amino groups, hydroxyl groups and their conjugate bases.

An example of a dimethine dye is Michler's hydrol. In triarylmethine dyes, the H-atom of the central methine group of Michler's hydrol is substituted by an aryl residue. An example of a triarylmethine dye is malachite green. The aryl residue of these dyes may contain an electron donor. An example of such a dye includes crystal violet. The aryl residue may be substituted by a naphthalene system, as in naphthalene green.

In aza analogues of diarylmethine dyes, aza nitrogen groups can be used to replace the methine groups. The central ring can be substituted in a para position to the nitrogen atom with any of the following NH, NR, Nar to form an azine, O to form an oxazine or S to form a thiazine.

Most of the aza (18) annulenes, which are natural dyes, are based on the porphyrin ring system. Such dyes contain a skeleton of 4-pyrrole rings cyclized in their alpha-alpha prime positions by 4 methine groups, and thus have the structural properties of phthalocyanine colorants. Phthalocyanine is a tetra aza derivative of tetrabenzoporphyrin. The copper complex of phthalocyanine and its derivatives, substituted in the benzene ring yield turquoise shades with good fastness properties.

Nitro dyes include a nitro group in an o-position to an electron donor, such as hydroxy or amino. Nitro dyes include amido yellow, which can be made by nucleophilic substitution of 2,4-dinitrochlorobenzene with 4-aminodiphenylamine-2-sulfonic acid.

Nitroso dyes include a nitroso group in an o-position to an hydroxyl group. An example of a nitroso dye is naphthol yellow, 2,4-dinitro-1-naphthol-7-sulfonic acid.

The azo dyes are well known and include anionic monoazo dyes, aromatic azo compounds, disperse azo dyes, cationic azo dyes, complex forming monoazo dyes, and reactive azo dyes.

The anthraquinone dyes include ionic anthraquinone, anionic anthraquinone, cationic anthraquinone and substituted anthraquinones as disperse dyes.

Sulfur dyes are characterized by di and polysulfide bonds between aromatic residues. Sulfur dyes are obtainable by treating aromatic amines, phenols and aminophenols with sulfur and sodium polysulfide or both. An example of a sulfur dye is Condense Sulfur Orange.

It has been found that it is also desirable for good color with longevity to protect the dye in the primary coating during curing while maintaining good thermal or oxidative stability of the inner primary coating and/or the outer primary coating. Accordingly, a stabilizer package is preferably employed. Protection of the dye-containing inner primary coating can occur in alternative ways. For example, the uncured inner primary coating composition, itself, can include the stabilizer package, or the outer primary coating composition can include the stabilizer package or both the inner primary coating and the outer primary coating may include the stabilizer package. Inclusion of the light stabilizer package in the outer primary coating operatively functions to protect the inner primary coating, and is preferred.

The stabilizer package includes at least one antioxidant, optionally, at least one secondary antioxidant and at least one UV light stabilizer and/or UV absorber in amounts sufficient to protect the dye and the coating in the cured compositions while maintaining good thermal or oxidative stability. The amount of each of the compounds of the stabilizer package of the combination used in the present invention is not narrowly critical and can be readily determined by the person skilled in the art based on the present disclosure. In general, the amount of antioxidant, secondary antioxidant, if included, and UV light stabilizer and/or UV light absorber is in the range, for example, of from about 0.01 wt % to about 7.0 wt %, and preferably, of from about 0.1 wt % to about 1.5 wt %.

Generally, antioxidants are included in the coating composition in order to react with free radicals so as minimize or even inhibit the destruction of the dye and the coating. Antioxidants which can be used in the present invention include, for example, secondary amines and derivatives of phenol and hindered phenols.

Examples of antioxidants which can be used include: thiodiethylene bis(3,5,-di-tbutyl-4-hydroxy)hydrocinnamate, triethylene glycol bis[3-3(-t-butyl-4-hydroxy-5-methylphenyl)propionate], 2,2'-thiodiethyl bis-(3,5-di-t-butyl-4'-hydroxyphenyl)propionate, N,N'diphenyl-p-phenylenediamine, phenyl-β-naphtylamine, 2,6-di-t-butyl-p-cresol, 2,2'-methylenebis(4-methyl-6-t-butylphenol), 4,4-thiobis(3-methyl-6-5-butylphenol, octadecyl 3,5-di-t-butyl-4-hydroxyhydrocinnamate, octadecyl 3-(3,5-di-t-butyl-4-hydroxyphenyl) propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakismethylene(3,5-di-t-butyl-4-hydrroxycinnamate), tetrakis[methylene 3-(3',5'di-t-butyl-4'-hydroxy-phenyl propionate]methane.

Preferred antioxidants are hindered phenols. Hindering the phenolic hydroxyl group with at least one bulky alkyl group in the ortho position is preferred for high antioxidant activity. A preferred type of antioxidant for radiation-curable coating compositions is a thiodiethylene cinnamate derivative, specifically, thiodiethylene bis(3,5-di-t-butyl-4-hydroxyhydrocinnamate) which is commercially available as Irganox 1035 from Ciba-Geigy. The antioxidant can be, for example, present in the uncured inner primary or outer primary coating composition in an amount of from about 0.1 wt % to about 4 wt %.

Secondary antioxidants which can be used in the stabilizer package of the present invention include, for example, aliphatic thiols, disulfides and phosphites. The secondary antioxidant can be present in the uncured coating composition in about 0.1 wt % to about 3 wt %, for example.

Secondary antioxidants which can be used in the stabilizer package include, for example:
distearyl pentaerythritol diphosphite,
isodecyl diphenyl phosphite,
diisodecyl phenyl phosphite,
tris(2,4-di-t-butylphenyl)phosphite,
dilauryl-β,β-thiodipropionate,
β-naphthyl disulfide,
thiol-β-naphthol,
2-mercaptobenzothiazole,
benzothiazyl disulfide,
phenothiazine,
tris(p-nonylphenyl)phosphite,
zinc dimethyldithiocarbamate.

Hindered amine light stabilizers (HALS) are very effective inhibitors of photo-oxidation of polymers, and are suitable for use in the stabilizer package. Unlike UV absorbers, HALS do not disturb UV radiation at frequencies that are destructive to polymers. Some HALS additives have been shown-to be more basic than is desirable for optical fiber coating composition use. Accordingly, it is preferred to select HALS additives for optical fiber coating compositions which are less basic in nature. Hindered piperidines are preferred.

Examples of hindered amine light stabilizers which can be used in the present invention include:
bis(2,2,6,6-tetramethyl-4-piperidinyl)sebacate,
bis(1-octyloxy-2,2,6,6-tetramethyl-4-piperidinyl)sebacate,
dimethyl succinate polymer with 4-hydroxy-2,2,6,6-tetramethyl-1-piperidine ethanol,
polymeric hindered amine (Cyasorb UV-3853S).

Examples of UV light absorbers which can be used in the present invention include benzophenones and benzotriazoles. More particularly, UV light absorbers which can be used in the present invention, include, for example:
2-hydroxy-4-methoxy benzophenone,
2-hydroxy-4-methoxy benzophenone-5-sulfonic acid,
2-hydroxy-4-n-octoxybenzophenone,
2,4-dihydroxybenzophenone,
2-hydroxy-4-n-dodecyloxybenzophenone,
2-(2'-hydroxy-3 '-tert-butyl-5 'methyl-phenyl)-5-chlorobenzotriazole,
2-(2'-hydroxy-3',5'-ditert-butylphenyl)-5-chlorobenzotriazole,
2-(2'-hydroxy-5'-methyl-phenyl)benzotriazole.

The combination of antioxidants, secondary antioxidants and UV light stabilizers and/or UV absorbers of the present invention retards the normally expected progress of yellowing of a cured optical fiber coating while maintaining very good thermal or oxidative properties. The stability of the composition after-cure, provided by the combination of antioxidants and UV light stabilizers and/or UV absorbers, is highly beneficial to protect the color of the inner primary coating.

Thus, the inclusion of the combination of antioxidants, secondary antioxidants and UV light stabilizers and/or UV absorbers in a radiation-curable coating composition results in reduction in coating discoloration produced by a prolonged exposure to fluorescent or ultraviolet light.

It will also be appreciated by those skilled in the art that the function of one or more of the antioxidants, secondary oxidants and UV light stabilizers and/or UV absorbers can be combined into one compound. By way of example, and not in limitation, a combination of a light stabilizer and a UV absorber is propanedioic acid [(4-methoxyphenyl)-methylene]-, bis(1,2,2,6,6-pentamethyl-4-piperidinyl)ester (CAS Registry Number 147783-69-5).

The dyes or dye precursors that are useful in the radiation-curable coatings of the present invention can be reactive compounds. Preferably, the reactive dye or dye precursor is itself UV-curable, and becomes chemically bonded in the cured polymeric coating. Reactive dyes or dye precursors are advantageously used to impart color to the coating composition in place of pigments to avoid concerns associated with pigment particle size, pigment dispersion and the like when pigments are used. Reactive dyes or dye precursors also provide coatings in which dye migration is reduced, thereby minimizing dye agglomeration in the cured, finished coating. Reactive dyes or dye precursors also reduce dye breakout or extractability in the cured, finished coating. The reactive dyes can be beneficially included in any one or more of an inner primary coating, an outer primary coating, an ink composition, a buffering coating, a single coating, and matrix materials. Use of the reactive dyes or dye precursors in coatings for optical fiber used in "loose tube" applications is particularly desirable because the reactive dyes or dye precursors are not leached out of the coating by the aliphatic oils and/or gels commonly used to cushion the optical fibers in such applications.

The reactive dyes and dye precursors can be made by reacting a linking compound, which includes a radiation-curable functionality, with a dye or dye precursor. Dyes or dye precursors that have a reactive functionality that is not a part of the chromophore, or which can be chemically modified to include a reactive functionality without adversely affecting the chromophore can be used to form the reactive dyes and dye precursors. Similar considerations apply to colorless dyes that will change to a color upon exposure to ultraviolet radiation during cure.

The reactive functionality in the dye or dye precursor can be any group that is capable of reacting with a linking group that is used to make the reactive dyes or dye precursors. Illustrative of reactive functionalities that are found in, or can be added to, dyes or dye precursors include, but are not limited to, hydroxyl, amino, including secondary amino, thiol, carboxyl, mercapto, vinyl, acryl, epoxy, carbamate, or the like. Any of the dyes or dye precursors described herein can be used as the chromophore.

The linking compound desirably comprises a radiation-curable functionality and a second functionality capable of reacting with the reactive functionality of the dye or dye precursor. Preferably, the radiation-curable functionality of the linking group is ethylenic unsaturation, which can be polymerized through radical polymerization or cationic polymerization. For example, suitable compounds which contain ethylenic unsaturation are acrylates, methacrylates, styrene, vinyl ether, vinylester, N-substituted acrylamide, N-viny amide, maleate esters, fumarate esters and the like. Other types of compounds that can be used to form the reactive dyes or dye precursors are compounds which include at least one of an epoxy group, a thiol-ene or an amine-ene, as described in more detail herein.

The viscosity of the liquid curable resin composition of the present invention is usually in the range from 200 to 20,000 cP, and preferably from 2,000 to 15,000 cP.

The radiation-curable compositions of the present invention may be formulated such that the composition after cure has a modulus as low as 0.1 MPa and as high as 2,000 MPa or more. Those having a modulus in the lower range, for instance, from 0.1 to 10 MPa, preferably 0.1 to 5 MPa, and more preferably 0.5 to less than 3 MPa are typically suitable for inner primary coatings for fiber optics. In contrast, suitable compositions for outer primary coatings, inks and matrix materials generally have a modulus of above 50 MPa, with outer primary coatings tending to have a modulus more particularly above 100 up to 1,000 MPa and matrix materials tending to be more particularly between about 50 MPa to about 200 MPa for soft matrix materials, and between 200 to about 1500 MPa for hard matrix materials. The radiation-curable composition of the present invention may be formulated such that the composition after cure has a $T_g$ between −70° C. and 30° C. The $T_g$ is measured as the peak tan-delta in a DMA curve at 2.5% elongation.

Elongation and tensile strength of these materials can also be optimized depending on the design criteria for a particular use. For cured coatings formed from radiation-curable compositions formulated for use as inner primary coatings on optical fibers, the elongation-at-break is typically greater than 80%, more preferably the elongation-at-break is at least 110%, more preferably at least 150% but not typically higher than 400%. For coatings formulated for outer primary coatings, inks and matrix materials the elongation-at-break is typically between 10% and 100%, and preferably higher than 30%.

The glass transition temperature ($T_g$), measured as the peak tan-delta determined by dynamic mechanical analysis (DMA), can be optimized depending on the particulars of the application. The glass transition temperature may be from 10° C. down to −70° C. or lower, more preferably lower than 0° C. for compositions formulated for use as inner primary coatings and 10° C. to 120° C. or higher, more preferably above 30° C., for compositions designed for use as outer primary coatings, inks and matrix materials.

The compositions of the present invention will preferably have a cure speed of 1.0 J/cm$^2$ (at 95% of maximum attainable modulus). For an outer primary coating, ink or matrix material, cure speed is preferably about 0.5 J/cm$^2$ or less (at 95% of maximum attainable modulus), and more preferably, about 0.3 J/cm$^2$ or less, and even more preferably, about 0.2 J/cm$^2$ or less.

The invention will be further explained by way of the following examples, without being limited thereto.

In the Examples, the following abbreviations and names are identified chemically, as follows:

| | |
|---|---|
| HDDA: | 1,6-hexanediol diacrylate; |
| PEA: | 2-phenoxy ethyl acrylate; |
| IBOA: | isobornylacrylate; |
| ENPA: | ethoxylated nonylphenyl acrylate |
| Oligomer A: | a polyether aromatic urethane acrylate oligomer; containing 16.2% of dicyclo-pentadienedimethyloldiacrylate and 12% of IBOA |
| Oligomer B: | a bisphenol A epoxy acrylate oligomer; |
| Oligomer C: | a polyether aliphatic urethane acrylate oligomer; |
| Oligomer D: | a polyether aromatic urethane acrylate oligomer; |
| Oligomer E: | a polyether aromatic urethane acrylate oligomer containing 21% of isobornyl acrylate and 2% of lauryl acrylate; |
| V-Pyrol: | N-vinyl pyrrolidone; |
| Photoinitiator A: | diphenyl(2,4,6-trimethylbenzoyl)phosphine oxide; |
| Photoinitiator B: | 1-hydroxycyclohexyl phenyl ketone; |
| Photoinitiator C: | phenyl bis(2,4,6-trimethylbenzoyl) phosphine oxide; |
| Photoinitiator D: | a blend of 25% bis[2,6-dimethoxybenzoyl]-2,4,4-trimethylphenyl bis phosphine oxide and 75% 2-hydroxy-2-methyl-1-phenyl-propan-1-one |

-continued

| | |
|---|---|
| Photoinitiator E: | an alpha hydroxy ketone available as KP100F from Sartomer |
| Photoinitiator F: | 2-hydroxy-2-methyl-1-phenylpropane-1-one |
| Stabilizer A: | dimethylsuccinate polymer with 4-hydroxy-2,2,6,6-tetramethyl-1-piperidine ethanol |
| Stabilizer B: | isooctyl 3-[3,5-di-tert-butyl-4-hydroxyphenyl] propionate |
| Stabilizer C: | bis[3,3-bis(4'-hydroxy-3'-t-butylphenyl) bisbutanoic acid]-glycol ester |
| Antioxidant A: | thiodiethylene bis(3,5-ditert-buty(-4-hydroxy)hydrocinnamate; |
| Silicone A: | OI, ME, 3-hydroxypropyl-ME, esters with polyethylene glycol acetate, silicones and siloxanes; |
| Silicone B: | siloxanes and silicones DI-ME hydrogen reaction product with polyethylene-poly-ethylene-polypropylene glycol; |
| Silicone C: | γ-mercaptopropyltrimethoxysilane |
| Cationic Photoinitiator A: | diaryliodonium hexafluoroantimonate; |
| Cationic Photoinitiator B: | mixed triarylsulfonium hexafluoroantimonate salt propylene carbonate; |
| Copikem 4 Black: | 6'-(diethylamino)-3'-methyl-2-(phenylamino)spiro(isobenzofuran-1(3H),9'-(9H)xanthen)-3-one; |
| Copikem 34 Black: | 2'-phenylamino-3'-methyl-6'-dibutylamino)-spiro[isobenzofuran-1(3H),9'-(9H)-xanthen]-3-one; |
| Copikem 7 Grape: | proprietary compound or composition, available from B. F. Goodrich. |
| Copikem 5 Grape: | 2'-di(phenylmethyl)amino-6'-(diethylamino)spiro(isobenzofuran-1(3H),9'-(9H)xanthen)-3-one; |
| Copikem 1 Blue: | 6-(dimethylamino)-3,3-bis(4-dimethyl-amino)-phenyl-1(3H)-isobenzofuranone, |
| Copikem 14 Orange: | proprietary compound or composition, available from B. F. Goodrich. |

EXAMPLES 1–5

These Examples illustrate the preparation of substantially colorless fiber optic coating compositions which include a colorless dye precursor system that imparts color to the coating composition upon curing.

In these examples, the following coating composition was used to evaluate curing and color formation with the five different dye precursors identified below.

| | Wt. % |
|---|---|
| HDDA | 26.98 |
| IBOA | 28.57 |
| PEA | 31.75 |
| Photoinitiator A | 6.35 |
| Photoinitiator B | 3.18 |
| Silicone A | 1.14 |
| Silicone B | 2.03 |

The following five different dye precursors were added to the uncured coating composition in an amount of 3 wt. %:

| | |
|---|---|
| Example 1: | Copikem 4 black |
| Example 2: | Copikem 34 black |
| Example 3: | Copikem 7 grape |
| Example 4: | Copikem 5 grape |
| Example 5: | Copikem 1 blue |

The cationic photoinitiator was GE Silicone UV 9380C, which comprises bis(4-dodecylphenyl) iodonium hexafluoroantimonate, 2-isopropylthioxanthone, $C_{12}$ and $C_{14}$ alkyl glycidyl ethers and linear alkylate dodecylbenzene. Each of the compositions of Examples 1–5 was completely colorless when made.

Each of the coating compositions of Examples 1–5 was cured under D lamp, radiation intensity 0.5 J/cm². All of the compositions cured to a film having strong color. The color was as follows:

| | |
|---|---|
| Example 1 | dark green |
| Example 2 | dark green |
| Example 3 | purple |
| Example 4 | green |
| Example 5 | blue |

EXAMPLE 6

This Example illustrates the preparation of substantially colorless fiber optic coating composition which includes a colorless dye precursor system that imparts color to the composition upon curing wherein the cationic photoinitiator is a sulfonium cationic photoinitiator.

In this Example, 94.34% by weight of the base formulation used in Examples 1–5 was mixed with 2.83% by weight of sulfonium cationic initiator commercially available from Union Carbide as UIV 6974 and 2.83% by weight of Copikem 7 grape. The composition was drawn as a film and cured by ultraviolet radiation of 1 J/cm². The film cured to a deep purple color.

EXAMPLES 7–8

Experiments A–B

These Experiments compare cure rate and cured coating physical properties of colored coatings made with pigments to cure rate and cured coating physical properties with colored coatings made with the colorless dye precursor system in accordance with the present invention. The coatings are suitable as matrix materials.

A batch of the following coating compositions was made to compare a composition with a blue pigment to a blue dye precursor and a composition with an orange pigment to an orange dye precursor.

Experiment A

| Components | % in composition |
|---|---|
| Oligomer A | 80.64 |
| Oligomer B | 5.87 |
| V-Pyrol | 7.53 |
| Photoinitiator A | 1.71 |
| Photoinitiator C | 0.24 |
| Photoinitiator B | 0.98 |
| Antioxidant A | 0.29 |
| Silicone B | 0.59 |
| Silicone A | 0.29 |
| Pigment (Blue) | 1.86 |
| Dye | 0.0 |
| Catalyst | 0.0 |

EXAMPLE 7

| Components | % in composition |
|---|---|
| Oligomer A | 80.64 |
| Oligomer B | 5.87 |
| V-Pyrol | 7.53 |
| Photoinitiator A | 1.71 |
| Photoinitiator C | 0.24 |
| Photoinitiator B | 0.98 |
| Antioxidant A | 0.29 |
| Silicone B | 0.59 |
| Silicone A | 0.29 |
| Pigment | 0.0 |
| Copikem 1 Blue | 0.93 |
| C Photoinitiator A | 0.93 |

Experiment B

| Components | % in composition |
|---|---|
| Oligomer A | 80.09 |
| Oligomer B | 5.83 |
| V-Pyrol | 7.48 |
| Photoinitiator A | 1.7 |
| Photoinitiator C | 0.24 |
| Photoinitiator B | 0.97 |
| Antioxidant A | 0.29 |
| Silicone B | 0.58 |
| Silicone A | 0.29 |
| Pigment (Orange) | 2.53 |
| Dye | 0.0 |
| Catalyst | 0.0 |

EXAMPLE 8

| Components | % in composition |
|---|---|
| Oligomer A | 80.09 |
| Oligomer B | 5.83 |
| V-Pyrol | 7.48 |
| Photoinitiator A | 1.7 |
| Photoinitiator C | 0.24 |
| Photoinitiator B | 0.97 |
| Antioxidant A | 0.29 |
| Silicone B | 0.58 |
| Silicone A | 0.29 |
| Pigment | 0.0 |
| Copikem 14(Orange) | 1.27 |
| C Photoinitiator A | 1.26 |

Coatings were stirred using electric mixer over low heat (approximately 60° C.) for approximately 3 hours. However, the catalyst (C (cationic) Photoinitiator A) was initially added to V-pyrol and stirred with electric mixer over low heat (approximately 55° C.) for approximately 30 minutes. Then, all other components were added.

TABLE 1

| | Tensile strength (MPa) | Elongation (%) | Modulus (MPa) | Estimated dose required for 95% cure (J/cm$^2$) |
|---|---|---|---|---|
| Experiment A | 32 | 12 | 960 | 0.26 |
| Example 7 | 34 | 18 | 934 | 0.16 |
| Experiment B | 35 | 26 | 920 | 0.24 |
| Example 8 | 32 | 24 | 922 | 0.18 |

TABLE 1-continued

The data above show that the matrix materials containing the colorant system of the present invention (Examples 7 and 8) achieved 95% cure at lower doses than expected.

The estimated dose (J/cm$^2$) required for 95% cure from the dose-modulus study described above is as follows:

| Dye Type | Matrix With Pigments | Matrix With Dye |
|---|---|---|
| Orange | 0.24 | 0.18 |
| Blue | 0.26 | 0.16 |

These data show that the curing speed using the colorant system of the present invention is faster than the curing speed with pigments, while maintaining desired physical characteristics such as modulus.

EXAMPLES 9–10

Experiments C–D

These Experiments illustrate the preparation of colored outer primary coatings using the colorless dye precursor system of the present invention.

A batch of the following coating compositions were made to compare a composition with an orange pigment to an orange dye precursor and a blue pigment to a blue dye precursor.

Experiment C

| Composition | % in composition |
|---|---|
| Oligomer C | 33.97 |
| Oligomer B | 31.54 |
| HDDA | 10.68 |
| IBOA | 14.57 |
| PEA | 0.98 |
| Photoinitiator A | 1.94 |
| Photoinitiator B | 0.98 |
| Photoinitiator E | 1.94 |
| Pigment (Orange) | 3.4 |
| Dye | 0.0 |
| Catalyst | 0.0 |

EXAMPLE 9

| Components | % in composition |
|---|---|
| Oligomer C | 33.97 |
| Oligomer D | 0.26 |

-continued

| Components | % in composition |
|---|---|
| Oligomer B | 31.54 |
| HDDA | 10.76 |
| IBOA | 14.57 |
| PEA | 1.04 |
| Photoinitiator A | 1.94 |
| Photoinitiator B | 0.98 |
| Photoinitiator E | 1.94 |
| Pigment | 0.0 |
| Copikem 14 (Orange) | 1.5 |
| C Photoinitiator A | 1.5 |

Experiment D

| Components | % in composition |
|---|---|
| Oligomer C | 33.83 |
| Oligomer B | 31.42 |
| HDDA | 10.64 |
| IBOA | 14.51 |
| PEA | 0.97 |
| Photoinitiator A | 1.93 |
| Photoinitiator B | 0.97 |
| Photoinitiator E | 1.93 |
| Pigment (Blue) | 3.8 |
| Dye | 0.0 |
| Catalyst | 0.0 |

EXAMPLE 10

| Components | % in composition |
|---|---|
| Oligomer C | 33.83 |
| Oligomer D | 1.18 |
| Oligomer B | 31.41 |
| HDDA | 11.0 |
| IBOA | 14.51 |
| PEA | 1.24 |
| Photoinitiator A | 1.93 |
| Photoinitiator B | 0.97 |
| Photoinitiator E | 1.93 |
| Pigment | 0.0 |
| Copikem 1 (Blue) | 1.0 |
| Catalyst | 1.0 |

The estimated dose (J/cm$^2$) required for 95% cure from the dose-modulus study described above is as follows:

| Dye Type | Coating With Pigments | Coating With Dyes |
|---|---|---|
| Orange | 0.36 | 0.27 |
| Blue | 0.48 | 0.36 |

These data show that the curing speed using the colorant system of the present invention is faster than the curing speed with pigments, while maintaining desired physical characteristics such as modulus.

EXAMPLE 11

This Example illustrates the preparation of an inner primary coating base with a stabilizer. The formulation for the inner primary coating is set forth in Table II.

TABLE II

| Component | Ex. 11 wt % |
|---|---|
| Oligomer E | 65.00 |
| ENPA | 18.40 |
| N-vinylcaprolactam | 8.00 |
| Photoinitiator D | 1.50 |
| Photoinitiator F | 0.50 |
| Photoinitiator A | 1.50 |
| Stabilizer B | 3.70 |
| Stabilizer C | 0.10 |
| Antioxidant A | 0.20 |
| Diethylamine | 0.10 |
| Silicone C | 1.00 |
| Total amount: | 100.00 |

Colored dyes were added to the inner primary coating of Example 11 for aging studies. The Yellow dye used was Neozapon yellow 075, the Red dye was Neozapon red 365, and the Blue dye was Neozapon blue 807. The Neozapon dyes are commercially available from BASF. Aging studies were conducted on the colored coatings to determine color stability of the coatings.

In the first aging study, the colored coatings were subjected to high intensity fluorescent light, at 5.5 microwatts/cm$^2$ continuously for four weeks. Three tests were carried out in this aging study. In one test, only the colored primary coatings were tested, in a second test, the colored primary coatings coated with a secondary coating (Without stabilizer) were tested and in a third test, colored primary coatings coated with an outer primary (or secondary) coating that included a stabilizer, 2-ethyl,2'-ethoxy-oxalanilide, were tested. In each of these tests, the colored primary coatings were found to exhibit excellent color stability.

A second aging study was conducted on the same array of colored inner primary coatings, that is, colored primary coating alone, colored inner primary coating coated with a secondary coating (without stabilizer), and a colored inner primary coating coated with a secondary coating, which included the stabilizer identified above. In the second aging study, the coatings were maintained in an oven at 85° C. continuously for four weeks. In this study, all the colored inner primary coatings exhibited excellent color stability.

A third aging study was conducted with the same array of colored inner primary coatings and secondary coatings as described above. In this aging study, the coatings were maintained in an oven at 85° C. and 85% relative humidity continuously for four weeks. In this study, it was again found that the colored inner primary coatings exhibited excellent color stability.

EXAMPLE 12

This Example illustrates the preparation of a reactive dye. The dye was made reactive by the addition of an acrylate group to the dye.

Isophorone diisocyanate (17.12 g), BHT (0.05 g) and dibutyltindilaurate (0.05 g) were added to a flask purged with air and stired to dissolve solids. Hydroxyethylacrylate (8.92 g) was added dropwise while maintaining the temperature below about 40° C. and checking the NCO content.

Reactint Red X64 (53.86 g), commercially available from Milliken Research Corporation, was then added to the flask all at once to form the reactive dye, while maintaining the temperature below about 80° C. Thereafter, hexane diol diacrylate (20.00 g) was added to decrease the viscosity of the reactive dye.

EXAMPLE 13

Acetone extractables for a color coating prepared using red-colored reactive dye were compared to acetone extractables with a color coating prepared using a non-reactive red dye. Each dye type was added to a conventional radiation curable secondary coating composition comprising a urethane acrylate oligomer, acrylated diluents and photoinitiators.

The colored coatings were drawn down on glass cured at 1 J/cm$^2$, N$_2$, D lamp, of 6 mil thickness and cut into three 1½"×1½" squares. The coatings were dried at 60° C. for 2½ hours and were then placed in a dessicator to insure dryness. The samples were then extracted with 100 ml acetone for 24 hours at room temperature (23–24° C.). The acetone extractables for the coating made with the reactive dye was about 0.66%, while the acetone extractables for the coating made with the nonreactive dye was about 2.51%. The following examples further illustrate the invention but, of course, should not be construed as in any way limiting its scope.

What is claimed is:

1. A radiation-curable fiber optic coating composition comprising, in the uncured state, at least one monomer or oligomer having a radiation-curable functional group which can form free radicals in the presence of actinic radiation, a photoinitiator for said monomer or oligomer present in an amount sufficient to effect radiation cure of said monomer or oligomer, a coloring agent capable of imparting a pre-selected color to the coating, and a stabilizer package, said stabilizer package comprising color protecting compounds consisting essentially of at least one antioxidant and a hindered piperidine UV-light stabilizer.

2. The fiber optic coating composition of claim 1, wherein the coloring agent is a dye or a dye precursor.

3. The fiber optic coating composition of claim 1, wherein the coating composition is an inner primary coating composition.

4. The fiber optic coating composition of claim 2 wherein said dye or dye precursor is selected from the group consisting of polymethine dyes, diarylmethine dyes, triarylmethine dyes, aza analogues of diarylmethine dyes, aza (18) annulenes, nitro dyes, nitroso dyes, azo dyes, anthraquinone dyes and sulfur dyes.

5. The fiber optic coating composition of claim 4 wherein said dye or dye precursor is a metal azo complex.

6. The fiber optic coating composition of claim 2 wherein said composition includes at least two different dye precursors.

7. An optical fiber coated with the fiber optic coating composition of claim 1.

8. An optical fiber comprising a plurality of coating layers, wherein a first coating comprises the cured composition of a radiation-curable fiber optic coating composition comprising, in the uncured state, at least one monomer or oligomer having a radiation-curable functional group which can form free radicals in the presence of actinic radiation, a photoinitiator for said monomer or oligomer present in an amount sufficient to effect radiation cure of said monomer or oligomer, a coloring agent capable of imparting a pre-selected color to the coating, wherein the first coating comprises the stabilizer package of claim 1 or a coating exterior to the first coating comprises a cured composition comprising the stabilizer package of claim 1, to protect the coloring agent in said first coating.

9. An optical fiber ribbon assembly comprising a plurality of optical fibers and a matrix material, wherein at least one of said optical fibers is a coated fiber according to claim 7.

10. A coating composition system comprising a plurality of coating compositions in which a first coating composition comprises a dye as a coloring agent, and in which a coating composition exterior to the coating comprising the coloring agent, comprises a stabilizer package to protect the dye in said composition, wherein the stabilizer package comprises at least one antioxidant and a hindered piperidine UV-light stabilizer.

11. The coating composition system of claim 10, wherein the first coating composition is an inner primary coating composition.

12. The coating composition system of claim 10 wherein said dye is selected from the group consisting of polymethine dyes, diarylmethine dyes, triarylmethine dyes, aza analogues of diarylmethine dyes, aza (18) annulenes, nitro dyes, nitroso dyes, azo dyes, anthraquinone dyes and sulfur dyes.

13. The coating composition system of claim 12 wherein said dye is a metal azo complex.

14. The coating composition system of claim 10, wherein said stabilizer package further comprises a UV light absorber.

15. An optical fiber coated with the coating composition system according to claim 10.

16. An optical fiber ribbon assembly comprising a plurality of optical fibers and a matrix material, wherein at least one of said optical fibers is a coated fiber according to claim 15.

17. A radiation-curable fiber optic coating composition for an inner primary coating, comprising, in the uncured state, at least one monomer or oligomer having a radiation-curable functional group which can form free radicals in the presence of actinic radiation, a photoinitiator for said monomer or oligomer present in an amount sufficient to effect radiation cure of said monomer or oligomer, a coloring agent capable of imparting a pre-selected color to the inner primary coating, and a stabilizer package comprising at least one antioxidant and a hindered piperidine UV-light stabilizer.

18. The composition of claim 1, wherein said stabilizer further comprises a UV-light absorber.

19. The composition of claim 1, wherein said hindered piperidine light stabilizer is selected from the group consisting of:
   bis(2,2,6,6-tetramethyl-4-piperidinyl)sebacate;
   bis(1-octyloxy-2,2,6,6-tetramethyl-4-piperidinyl)sebacate;
   dimethyl succinate polymer with 4-hydroxy-2,2,6,6-tetramethyl-1-piperidine ethanol; and
   polymeric hindered amine.

20. A radiation-curable fiber optic coating composition comprising, in the uncured state, at least one monomer or oligomer having a radiation-curable functional group which can form free radicals in the presence of actinic radiation, a photoinitiator for said monomer or oligomer present in an amount sufficient to effect radiation cure of said monomer or oligomer, a coloring agent capable of imparting a pre-selected color to the coating, and a stabilizer package, said stabilizer package comprising at least one antioxidant, a hindered piperidine UV-light stabilizer, and a UV-light absorber, wherein said hindered piperidine light stabilizer and said UV-absorber are combined and said combination is:
propanedioic acid [(4-methoxyphenyl)-methylene]-;
bis(1,2,2,6,6-pentamethyl-4-piperidinyl)ester.

21. The composition of claim 20, wherein said UV-absorber is a member selected from the group consisting of benzophenones and benzotriazoles.

22. The composition of claim 21, wherein said UV-absorber is a member selected from the group consisting of;
2-hydroxy-4-methoxy benzophenone;
2-hydroxy-4-methoxy benzophenone-5-sulfonic acid;
2-hydroxy-4-n-octoxybenzophenone;
2,4-dihydroxybenzophenone;
2-hydroxy-4-n-dodecyloxybenzophenone;
2-(2'-hydroxy-3'-tert-butyl-5'methyl-phenyl)-5-chlorobenzotriazole;
2-(2'-hydroxy-3',5'-ditert-butylphenyl)-5-chlorobenzotriazole; and
2-(2'-hydroxy-5'-methyl-phenyl)benzotriazole.

23. The composition of claim 20, wherein said UV-absorber is a member selected from the group consisting of:
isooctyl 3-[3,5-di-tert-butyl-4-hydroxyphenyl]propionate; and
bis[3,3-bis(4'-hydroxy-3'-t-butylphenyl)bisbutanoic acid]-glycol ester.

24. A radiation-curable fiber optic coating composition comprising, in the uncured state, at least one monomer or oligomer having a radiation-curable functional group which can form free radicals in the presence of actinic radiation, a photoinitiator for said monomer or oligomer present in an amount sufficient to effect radiation cure of said monomer or oligomer, a coloring agent capable of imparting a pre-selected color to the coating, and a stabilizer package, said stabilizer package comprising a primary antioxidant selected from the group consisting of secondary amines, derivatives of phenol, and derivatives of hindered phenols, a secondary antioxidant selected from the group consisting of aliphatic thiols, disulfides, and phosphites, and a member selected from the group consisting of a UV-light stabilizer, a UV-light absorber, and combination thereofs.

25. The fiber optic coating composition of claim 24, wherein the coating composition is an inner primary coating composition.

26. The fiber optic coating composition of claim 24, wherein the coloring agent is a dye or a dye precursor.

27. The fiber optic coating composition of claim 26 wherein said dye or dye precursor is selected from the group consisting of polymethine dyes, diarylmethine dyes, triarylmethine dyes, aza analogues of diarylmethine dyes, aza (18) annulenes, nitro dyes, nitroso dyes, azo dyes, anthraquinone dyes and sulfur dyes.

28. The fiber optic coating composition of claim 26 wherein said dye or dye precursor is a metal azo complex.

29. The fiber optic coating composition of claim 26 wherein said composition includes at least two different dye precursors.

30. An optical fiber coated with the fiber optic coating composition of claim 24.

31. A fiber optic comprising a plurality of coating layers, wherein a first coating comprises the cured composition of claim 24 and in which the first coating or a coating exterior to the first coating comprises a cured composition comprising a stabilizer package to protect the coloring agent in said first coating.

32. An optical fiber ribbon assembly comprising a plurality of optical fibers and a matrix material, wherein at least one of said optical fibers is a coated fiber according to claim 30.

33. The composition of claim 24, wherein said UV-light stabilizer is a hindered amine light stabilizer.

34. The composition of claim 33, wherein said hindered amine light stabilizer is a hindered piperidine light stabilizer.

35. The composition of claim 34, wherein said hindered piperidine light stabilizer is selected from the group consisting of:
bis(2,2,6,6-tetramethyl-4-piperidinyl)sebacate;
bis(1-octyloxy-2,2,6,6-tetramethyl-4-piperidinyl)sebacate;
dimethyl succinate polymer with 4-hydroxy-2,2,6,6-tetramethyl-1-piperidine ethanol; and
polymeric hindered amine.

36. The composition of claim 24, wherein said UV-light stabilizer and said UV-light absorber are combined and said combination is:
propanedioic acid [(4-methoxyphenyl)-methylene]-;
bis(1,2,2,6,6-pentamethyl-4-piperidinyl)ester.

37. The composition of claim 24, wherein said UV-absorber is a member selected from the group consisting of benzophenones and benzotriazoles.

38. The composition of claim 37, wherein said UV-absorber is a member selected from the group consisting of:
2-hydroxy-4-methoxy benzophenone;
2-hydroxy-4-methoxy benzophenone-5-sulfonic acid;
2-hydroxy-4-n-octoxybenzophenone;
2,4-dihydroxybenzophenone;
2-hydroxy-4-n-dodecyloxybenzophenone;
2-(2'-hydroxy-3'-tert-butyl-5'methyl-phenyl)-5-chlorobenzotriazole;
2-(2'-hydroxy-3',5'-ditert-butylphenyl)-5-chlorobenzotriazole; and
2-(2'-hydroxy-5'-methyl-phenyl)benzotriazole.

39. The composition of claim 24, wherein said UV-absorber is a member selected from the group consisting of:
isooctyl 3-[3,5-di-tert-butyl-4-hydroxyphenyl]propionate; and
bis[3,3-bis(4'-hydroxy-3'-t-butylphenyl)bisbutanoic acid]-glycol ester.

40. A coating composition system comprising a plurality of coating compositions in which a first coating composition comprises a dye as a coloring agent, and in which the same, or a coating composition exterior to the coating comprising the coloring agent, comprises a stabilizer package to protect the dye in said composition, said stabilizer package comprising a primary antioxidant selected from the group consisting of secondary amines, derivatives of phenol, and derivatives of hindered phenols, a secondary antioxidant selected from the group consisting of aliphatic thiols, disulfides, and phosphites, and a member selected from the group consisting of a UV-light stabilizer, a UV-light absorber, and combinations thereof.

41. The coating composition system of claim 40, wherein the first coating composition is an inner primary coating composition.

42. The coating composition system of claim 40 wherein said dye is selected from the group consisting of polymethine dyes, diarylmethine dyes, triarylmethine dyes, aza analogues of diarylmethine dyes, aza (18) annulenes, nitro dyes, nitroso dyes, azo dyes, anthraquinone dyes and sulfur dyes.

43. The coating composition system of claim 42 wherein said dye is a metal azo complex.

44. The coating composition system of claim 40, wherein said stabilizer package further comprises a hindered amine light stabilizer.

45. An optical fiber coated with the coating composition system according to claim 40.

46. An optical fiber ribbon assembly comprising a plurality of optical fibers and a matrix material, wherein at least one of said optical fibers is a coated fiber according to claim 45.

47. A radiation-curable fiber optic coating composition for an inner primary coating, comprising, in the uncured state, at least one monomer or oligomer having a radiation-curable functional group which can form free radicals in the presence of actinic radiation, a photoinitiator for said monomer or oligomer present in an amount sufficient to effect radiation cure of said monomer or oligomer, a coloring agent capable of imparting a pre-selected color to the inner primary coating, and a stabilizer package comprising a primary antioxidant selected from the group consisting of secondary amines, derivatives of phenol, and derivatives of hindered phenols, a secondary antioxidant selected from the group consisting of aliphatic thiols, disulfides, and phosphites, and a member selected from the group consisting of a UV-light stabilizer, a UV-light absorber, and combinations thereof.

48. A radiation-curable fiber optic coating composition comprising, in the uncured state, at least one monomer or oligomer having a radiation-curable functional group which can form free radicals in the presence of actinic radiation, a photoinitiator for said monomer or oligomer present in an amount sufficient to effect radiation cure of said monomer or oligomer, a coloring agent capable of imparting a pre-selected color to the coating, and a stabilizer package, said stabilizer package comprising at least one antioxidant and a hindered piperidine UV-light stabilizer, wherein said hindered piperidine UV-light stabilizer is selected from the group consisting of:

dimethyl succinate polymer with 4-hydroxy-2,2,6,6-tetramethyl-1-piperidine ethanol; and polymeric hindered amine.

* * * * *

UNITED STATES PATENT AND TRADEMARK OFFICE
CERTIFICATE OF CORRECTION

PATENT NO.         : 7,122,247 B2                                          Page 1 of 1
APPLICATION NO.    : 10/631563
DATED              : October 17, 2006
INVENTOR(S)        : Lin Jibing et al.

It is certified that error appears in the above-identified patent and that said Letters Patent is hereby corrected as shown below:

On title page, item [63]
The Related U.S. Application Data heading now reads:

Continuation of application No. 09/625,853.

Please change this to read:

--Continuation of application No. 09/625,653 --

Signed and Sealed this

Fourth Day of September, 2007

JON W. DUDAS
*Director of the United States Patent and Trademark Office*